Figure 1:
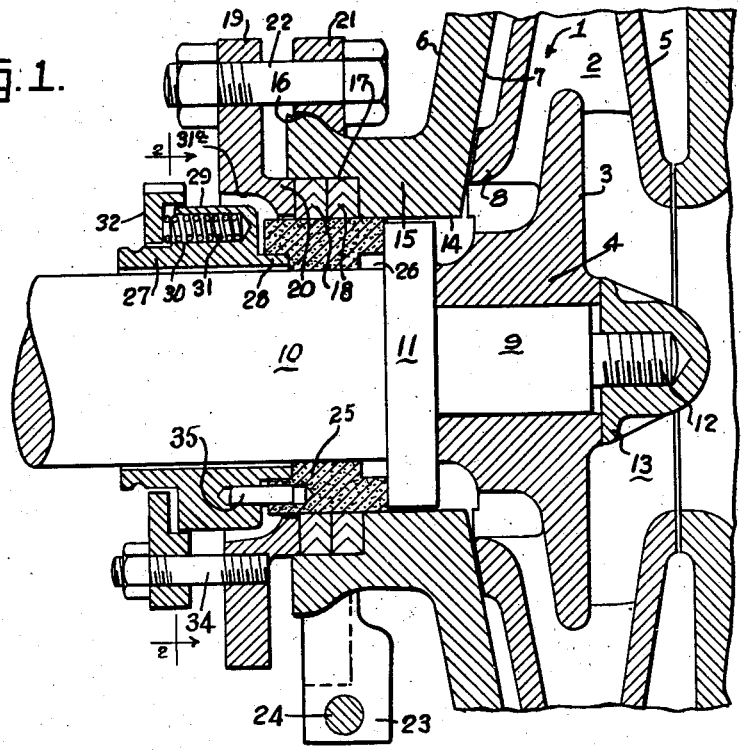

Sept. 24, 1946.  O. JACOBSEN  2,408,315

SHAFT SEAL

Filed Oct. 4, 1943

INVENTOR
OYSTEIN JACOBSEN
BY
Toulmin & Toulmin
ATTORNEYS

Patented Sept. 24, 1946

2,408,315

UNITED STATES PATENT OFFICE 2,408,315

SHAFT SEAL

Oystein Jacobsen, Montgomery County, Ohio, assignor to The Duriron Company, Inc., Dayton, Ohio, a corporation of New York Application October 4, 1943, Serial No. 504,825

2 Claims. (Cl. 286—7)

The present invention relates to centrifugal pumps, and more particularly to the seals of those pumps which are designed to operate at considerable velocities and adapted to handle corrosive fluids.

When employing the pump for conveying an acid-containing solution, all parts of the pump which come into contact with the corrosive liquid are usually fabricated of non-attackable metal such as silicon iron. Metal of this character is so hard that it is practically unmachineable. The remaining parts of the pump and associated structure are usually made of machineable metal such as wrought iron or steel, which is readily susceptible to attack by acid so that considerable precaution must be exercised to prevent the acid from reaching these parts.

It has been proposed heretofore to employ for an effective seal a graphite member which is pressed against a rotating part of the shaft at a suitable position in order to prevent longitudinal and radial creepage of the acid which might otherwise reach the bearings in which the shaft is journaled. Inasmuch as there is relative movement between the seal member and the shaft and other rotating parts the seal member becomes worn over a period of time and often this wear is not uniform so that even when adequate pressure is applied to the seal member a limited but important leakage may take place which might impair the operation of the structure as a whole. It will be understood that in pumps of this character extremely high pressures are often imparted to the liquid and even the smallest irregularity at the bearing surface may permit sufficient leakage to cause considerable damage.

It has been customary in the past, when the contact surface between the seal member and the rotating part become uneven or irregular, to disassemble the entire seal structure and to replace the sealing member with a new element by which the closeness of fit and regularity of surface could be obtained. However this discarding of the used seal member entails considerable expense which can be avoided by the teachings of the present invention.

The primary object of the invention is to provide a seal structure for centrifugal pumps in which the sealing member offers considerably longer operating life than similar devices of the prior art.

Another object is to simplify the design and construction of the seal member to the extent that it may be readily fabricated and is of symmetrical shape so as to lend itself to ease of assembly within the seal structure as a whole.

Other objects and features will be apparent as the following specification is perused in connection with the accompanying drawing in which:

Figure 1 represents a longitudinal fragmentary section of the improved seal and embodying the principles of the present invention. In this figure the shaft and also the connecting bolts and the locating pin are shown in elevation for clearness. This view is taken along line 1—1 in Figure 2.

Figure 2:
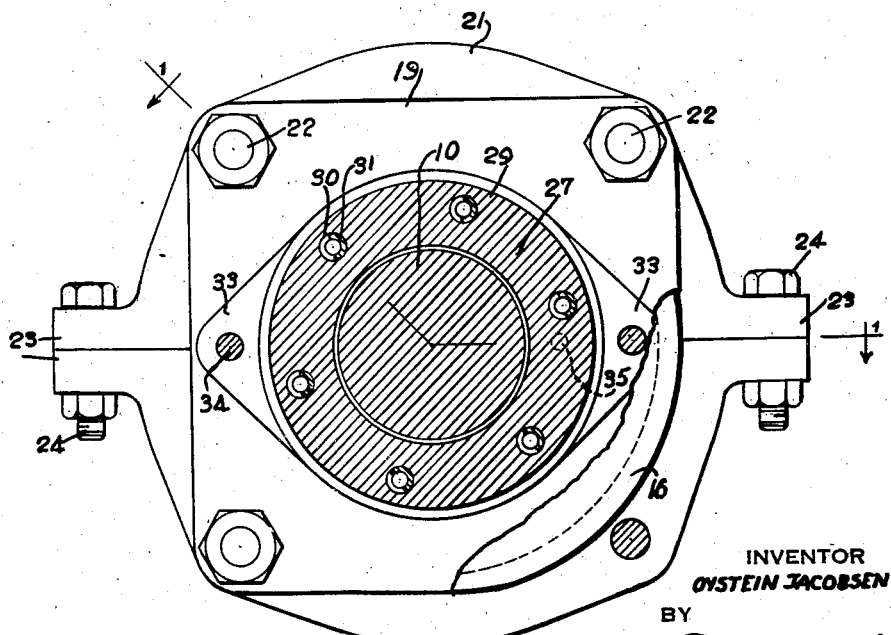

Figure 2 is a vertical sectional view of the structure shown in Figure 1, this view being taken approximately along the line 2—2 in Figure 1.

Referring to the drawing, reference character 1 designates in general an impeller of the closed or shrouded type. The impeller may comprise, in part, a plurality of radially extending blades 2 equidistantly disposed about the web 3 of a hub 4. The blades 2 are contained between the opposite walls 5 of the shroud and the entire impeller assemblage is adapted to rotate within a pump casing 6 of volute configuration. As shown in Figure 1 the inner surface 7 of the casing 6 at one side is given an inwardly tapered or conical shape and the adjacent portion of the impeller shroud or wall is provided with a horizontally extending projection 8 which almost reaches the surface 7. This annular projection is for the purpose of preventing undue leakage of the liquid along the inner left hand wall of the pump casing, particularly when the pump is at rest although it will be understood that a small but important amount of leakage may find its way throgh the minute space between the wall 7 and the projection 8 and which leakage, unless eventually prevented, might cause creepage along the shaft. Such liquid in time would reach the bearings on which the shaft is mounted and attack the metal of these bearings.

The subject matter of the present invention is concerned primarily with an improved sealing structure which prevents that part of the liquid which might flow past the annular projection 8 from creeping along the shaft.

The hub 4 of the impeller is secured by keying (not shown) to a turned down extension 9 of the main shaft 10. The latter is usually mounted on an over-hanging journal structure which may be constituted of two or more sets of ball bearings and in which the inner ball bearing is positioned not far from the impeller. A collar 11 may be formed integral with the shaft 10 and positioned between the shaft portions 9 and 19 as shown but if desired the collar may be fabricated separate from the shaft and swetted or otherwise secured to the shaft at the proper position. The shaft portion 9 may terminate in a relatively large threaded stud 12 which receives an impeller nut 13 for forcing the impeller against the collar 11.

The casing 6 at the inner side is provided with a round opening 14 which just clears the collar 11. The casing is extended longitudinally to form a tubular portion 15 provided at its left hand end with a hump shaped enlargement 16. There is an annular recess 17 counter-bored from the outer end of the tubular portion, this recess being of such depth as to receive a pair of packing rings 18 which may be formed of synthetic rubber or other suitable material. It has been found that substances sold under the names of neoprene, Perbunan, and Thiokol are satisfactory for this purpose. The packing rings are held in position within the recess 17 by a rectangular gland plate 19 provided with an inwardly extending hub portion 20. The latter has a diametral size slightly less than that of the recess 17 so that the hub may enter the recess for a short distance. Thus, the plate is adapted to apply longitudinal pressure to the rings 18 as can be seen in the drawing. Compressional stress is exercised at the packing rings through the plate 19 by means of a split clamp plate 21 to which the gland plate 19 is bolted at four positions indicated at 22. The clamping plate 21 is provided with a plurality of horizontally disposed lugs 23 which are adapted to be bolted together as indicated at 24 in Figure 2. This clamp plate has a round opening of such shape as to conform to the humped surface 16 of the tubular portion 15 so that when the bolts 24 are tightened the parts of the clamped plate are held together as a single structure about the portion 15. Thus by tightening the bolts 22, the gland plate 19 is caused to move to the right (Figure 1) to apply a compression effect on the packing rings 18. This compression causes the packing rings to contact more tightly with the surfaces immediately adjacent the rings as is well understood in the art.

An annular seal member 25 of graphite surrounds the shaft 10 and is contained within the packing rings 18 so that the latter bear against the outer surface of the member. This sealing element is provided with an annular recess 26 at each end and is adapted to bear against the left hand surface of the collar 11. In order to assure a fairly close contact between the sealing member 25 and the collar 11 the sealing member is held longitudinally in its position by means of a circular retaining plate 27. This plate has an inner diameter considerably larger than the size of the shaft 10 so as to eliminate friction and at the right hand end is provided with a longitudinally extending flange portion 28 which is received by the left hand annular recess of the seal member 25. The plate 27 is provided with a cylindrical portion 29 of larger diameter and which portion is adapted to receive a plurality of countersunk openings 30 in which compression springs 31 are inserted. These springs have a normal length somewhat greater than the depth of the openings 30 so as to project beyond the outer edge of the enlarged portion 29. It is apparent that the inner surface of the gland plate 19 must be provided with a curved portion, indicated at 31a, which will clear the outside surface of the enlarged portion 29 of the retaining plate. The innermost diameter of the gland plate 19 is slightly larger than the seal member 25 so as to constitute an inwardly extending projection which is received by the recess 17. The springs are held in position, preferably under pressure, by means of a cover member 32 which takes generally a circular shape except for a pair of oppositely disposed wing portions 33 (see Figure 2). These wing portions are provided with openings for receiving a pair of bolts 34 threaded into the gland plate 19. The interior diameter of the cover plate 32 is usually large enough to clear the adjacent circumferential surface of the retaining plate 27 so that no friction at this point is encountered. Thus by tightening the bolts 34 the cover plate 32 may be moved to the right and the compression of the springs 32 is increased. Inasmuch as the cover plate is effectively secured to the clamp plate 21 through the bolts 34 and 22 any longitudinal movement of the cover plate with respect to the shaft 10 will apply additional pressure against the springs 31 which in turn forces the seal ring 25 to the right and thereby increases the contact pressure between this ring or member and the shaft collar 11.

It is therefore apparent that the pressure on the packing rings 18 may be controlled or adjusted by taking up on the bolts 22, thus increasing the contact pressure around the outer surface of the seal member 25 and moreover, tightening the bolts 34 serves effectively to increase the contact pressure between the seal member 25 and the collar 11. Consequently, any acid-containing liquid which flows toward the center of the casing wall 6 and along the interior conical surface 7 will find all passageways around the outer circular surface of the seal member 25 and across the flat inner end of the seal member blocked to fluid creepage so that the shaft 10 remains completely free of the metal-attacking fluid.

It will be understood that in operation the shaft 10 is rotated usually by an electric motor (not shown) and fluid is caused to enter the pump at the center of the impeller i. e. about the impeller nut 13 and this fluid is given an outward centrifugal movement by the blades or vanes and is collected within a volute chamber (not shown) which constitutes the pressure outlet. Thus all of the fluid within the pump is under fairly high pressure and this pressure tends to force a small portion of the fluid into any available space at the rear of the impeller and unless perfect sealing is effected such fluid might find its way into the bearings of the shaft. However, due to the presence of the sealing member 25 and the packing rings 18 a completely tight seal is provided which keeps the shaft entirely free of the liquid regardless of the amount of pressure imparted to the liquid by the impeller. While a limited amount of precession of the member 25 is permissible, in general I prefer that this member shall be fixed in space. For this purpose, there may be provided a locating pin 35 which is received by an opening drilled through the cover plate 32, the retaining plate 27, into the graphite member 25 as seen in Figure 1.

It is apparent that there is relative motion between the seal member 25 and the shaft collar 11 and notwithstanding the fact that this member is made of graphite, a self-lubricant, a certain amount of wear at the rotating surface is bound to be present. The effect of this wear might not be altogether uniform, for example, ridges or grooves might be formed in the graphite sealing member due to some physical peculiarity of the collar 11. Inasmuch as these ridges or other irregularities increase as the pump continues to operate the effectiveness of the seal might be impaired. It has been customary heretofore in such a case to dismantle the entire seal structure by removing the bolts 34 or rather their nuts and loosening up on the bolts 22 at which time the seal member 25 may be removed from its position. A new seal member was thereafter provided to replace the old element after which the bolting operation was performed in the reverse order. However, I have found that it is unnecessary to discard the faulty seal member 25 under such circumstances and in this connection, the member is given a symmetrical shape as can be readily seen on the drawing. Thus the recesses 26 at both ends have the same depth and outer diameters so as to provide end extensions of the same length and size. In the case of wear as explained above it would simply be necessary to remove the bolts 34 and loosen the bolts 22 at which time the ring 25 could be removed from the shaft, assuming that the shaft itself may be readily disconnected from its bearings as is usually the case. The member is then threaded over the shaft but in the reverse position so that the end of the member which had been located at the left hand side is now positioned in abutting relation with respect to the collar 11. Thus, as the bolts 22 and 34 are applied, complete and tight contact is again established between the right hand end of the seal member 25 and the left hand annular surface of the collar 11. The pitted or other irregularly shaped surface of the seal member is now positioned at the left hand end thereof but it will be noted that no sealing effect is necessary at this point since the longitudinal pressure is exerted on the seal member only at the left hand annular recess 26.

It is therefore apparent that the seal member 25 is provided initially with two end seal surfaces the second one of which may be used when the first becomes pitted or otherwise contains irregularities. To that extent the present invention contemplates the use of a seal member which gives at least twice the wear of such member if only one sealing surface thereon were available. By providing a symmetrical configuration for the seal member, the molding and machine work necessary for fabricating the member is greatly simplified since the recesses 26 are of the same depth and dimension and moreover, the workman does not have to use care in assembling the seal member on the shaft as both ends are exactly alike.

Having thus fully described my invention, what I claim as new and desire to secure by Letters Patent, is:

1. A seal for a high pressure fluid pump having a casing and a pump shaft, a collar on said shaft, a sealing ring surrounding the shaft and abutting said collar, said sealing ring being provided with annular recesses at opposite edges thereof immediately adjacent the shaft thereby providing a reduced surface area abutting said collar at a point spaced from said shaft, means for applying longitudinal pressure to said sealing ring, and simultaneously preventing rotation of said ring, said means including a plate loosely surrounding the shaft and adjustably secured to said casing, said plate having an annular projection which extends into the recess of the sealing ring at the end remote from the shaft collar in contact therewith to apply the longitudinal pressure to said sealing ring and a pin extending from said plate endwise into said sealing ring.

2. A seal for a high pressure fluid pump having a casing and a pump shaft, a collar on said shaft, a sealing ring surrounding the shaft and abutting said collar, said sealing ring being provided with annular recesses at opposite edges thereof immediately adjacent the shaft thereby providing a reduced surface area abutting said collar at a point spaced from said shaft, means for applying longitudinal pressure to said sealing ring, and simultaneously preventing rotation of said ring, said means including a plate loosely surrounding the shaft and adjustably secured to said casing, said plate having an annular projection which extends into the recess of the sealing ring at the end remote from the shaft collar in contact therewith to apply the longitudinal pressure to said sealing ring and a pin extending from said plate endwise into said sealing ring, said last mentioned plate being divided into two parts separated by a pluraltiy of longitudinally extending compression springs whereby when the position of one of the parts is adjusted with respect to the casing, the springs are placed under greater compression to force the other part of the plate with greater strength toward the sealing ring whereby the pressure between the sealing ring and the collar is increased.

OYSTEIN JACOBSEN.